US012617361B2

(12) United States Patent
Park

(10) Patent No.: US 12,617,361 B2
(45) Date of Patent: May 5, 2026

(54) APPARATUS FOR ESTIMATING BEHAVIOR OF VEHICLE OCCUPANT AND METHOD FOR THE SAME

(71) Applicants:HYUNDAI MOTOR COMPANY, Seoul (KR); Kia Corporation, Seoul (KR)

(72) Inventor: Joon Sang Park, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 556 days.

(21) Appl. No.: 18/121,799

(22) Filed: Mar. 15, 2023

(65) Prior Publication Data

US 2023/0294628 A1 Sep. 21, 2023

(30) Foreign Application Priority Data

Mar. 15, 2022 (KR) ........................ 10-2022-0032278

(51) Int. Cl.
*B60R 21/015* (2006.01)
*B60R 21/0132* (2006.01)
(52) U.S. Cl.
CPC .. *B60R 21/01538* (2014.10); *B60R 21/01542* (2014.10); *B60R 2021/01327* (2013.01)

(58) Field of Classification Search
None
See application file for complete search history.

(56) References Cited

U.S. PATENT DOCUMENTS

2019/0065872 A1* 2/2019 Yamanaka ........... G06N 3/0464

* cited by examiner

*Primary Examiner* — Lennin R Rodriguezgonzalez
(74) *Attorney, Agent, or Firm* — MORGAN, LEWIS & BOCKIUS LLP

(57) ABSTRACT

To robustly estimate three-dimensional behaviors of an occupant by fusing, through a particle filter, information obtained through vehicle indoor cameras and through vehicle internal information sensors, an occupant behavior estimation system includes: a camera configured to obtain images of the at least one occupant within the vehicle; sensors configured to obtain information on the vehicle; an image processing device configured to process images obtained from the camera and to obtain key point information of the at least one occupant and object tracking information that is provided by tracking the at least one occupant; and a vehicle safety controller configured to estimate the behaviors of the occupant by using a particle filter based on the information on the vehicle obtained through the sensors, the key point information and the object tracking information, which are obtained from the image processing device.

20 Claims, 6 Drawing Sheets

APPARATUS FOR ESTIMATING BEHAVIOR OF VEHICLE OCCUPANT AND METHOD FOR THE SAME

CROSS-REFERENCE TO RELATED APPLICATIONS

The present application claims the benefit of priority to Korea Patent Application No. 10-2022-0032278, filed on Mar. 15, 2022 in the Korean Intellectual Property Office, the entire contents of which is incorporated herein for all purposes by reference.

FIELD

Various embodiments relate to an apparatus for estimating vehicle occupant behaviors and a method for the same and more particularly to an apparatus for robustly estimating three-dimensional behaviors of an occupant by fusing, through a particle filter, information obtained through vehicle indoor cameras and through vehicle internal information sensors, and a method for the same.

BACKGROUND

An autonomous vehicle refers to a vehicle capable of traveling on its own accord without an operation of a driver.

The society of automotive Engineers divides the development of an autonomous driving technology into six stages. In the initial stage, a person monitors the driving environment, and the autonomous driving technology performs only a function of assisting the person to drive, such as steering assistance, acceleration/deceleration assistance. However, in the final stage, full automation without human intervention is provided, so that an autonomous driving system is responsible for driving a vehicle while monitoring all road conditions and environments.

In such an autonomous vehicle, the autonomous driving system indispensably obtains information on the interior and exterior of the vehicle. Also, in order to secure the safety of the occupant, it is necessary to obtain the three-dimensional behaviors of the occupant.

SUMMARY

The purpose of the present disclosure is to provide a method for robustly estimating three-dimensional behaviors of an occupant by utilizing a non-contact sensor such as a camera, and an apparatus for the same.

Also, the purpose of the present disclosure is to provide a method for robustly estimating three-dimensional behaviors of an occupant by fusing, through a particle filter, information obtained through a vehicle interior camera and a vehicle interior information sensor, and an apparatus for the same.

The technical problem to be overcome in this document is not limited to the above-mentioned technical problems. Other technical problems not mentioned can be clearly understood from those described below by a person having ordinary skill in the art.

One embodiment of the present disclosure is an occupant behavior estimation system that estimates behaviors of an occupant within a vehicle. The occupant behavior estimation system may include: a camera configured to obtain images of the occupant within the vehicle; sensors configured to obtain information on the vehicle; an image processing device configured to process images obtained from the camera and to obtain key point information of the occupant; and a vehicle safety controller configured to estimate the behaviors of the occupant by using a particle filter based on the information on the vehicle obtained through the sensors and the key point information obtained from the image processing device.

Another embodiment of the present disclosure is an occupant behavior estimation system that estimates behaviors of at least one occupant within a vehicle. The occupant behavior estimation system may include: a camera configured to obtain images of the at least one occupant within the vehicle; sensors configured to obtain information on the vehicle; an image processing device configured to process images obtained from the camera and to obtain key point information of the at least one occupant and object tracking information that is provided by tracking the at least one occupant; and a vehicle safety controller configured to estimate the behaviors of the occupant by using a particle filter based on the information on the vehicle obtained through the sensors, the key point information and the object tracking information, which are obtained from the image processing device.

Further another embodiment of the present disclosure is an occupant behavior estimation method of an occupant behavior estimation system. The occupant behavior estimation method may include: obtaining key point information from an image obtained through a camera; detecting at least one occupant based on the key point information, and obtaining object tracking information including information on the detected at least one occupant; and determining, based on the detected at least one occupant, whether detection of the existing occupant fails, whether an occupant corresponding to the existing occupant among the detected at least one occupant is present, and whether a new occupant is present; creating, in response to determining that a new occupant is present as a result of the determination, a first particle filter corresponding to the corresponding new occupant and initializing particles of the first particle filter; propagating, in response to determining that an occupant corresponding to the existing occupant is present as a result of the determination, particles of a second particle filter corresponding to the corresponding existing occupant, updating weightings of the particles, estimating behaviors of the corresponding existing occupant, resampling the particles when a specific condition is satisfied; and removing, in response to determining that the detection of an occupant corresponding to the existing occupant fails as a result of the determination, a third particle filter corresponding to the corresponding existing occupant.

According to various embodiments of the present disclosure, it is possible to more robustly and accurately estimate three-dimensional behaviors of an occupant by fusing information obtained through a vehicle interior camera and vehicle sensors in preparation for unexpected failure in the occupant behavior estimation based on artificial intelligence.

According to various embodiments of the present disclosure, the estimated three-dimensional behaviors of an occupant can be used for vehicle safety control in order to protect the occupant who is out of a regular position in an autonomous driving environment.

Advantageous effects that can be obtained from the present disclosure are not limited to the above-mentioned effects. Further, other unmentioned effects can be clearly understood from the following descriptions by those skilled in the art to which the present disclosure belongs.

DETAILED DESCRIPTION

Figure 1:
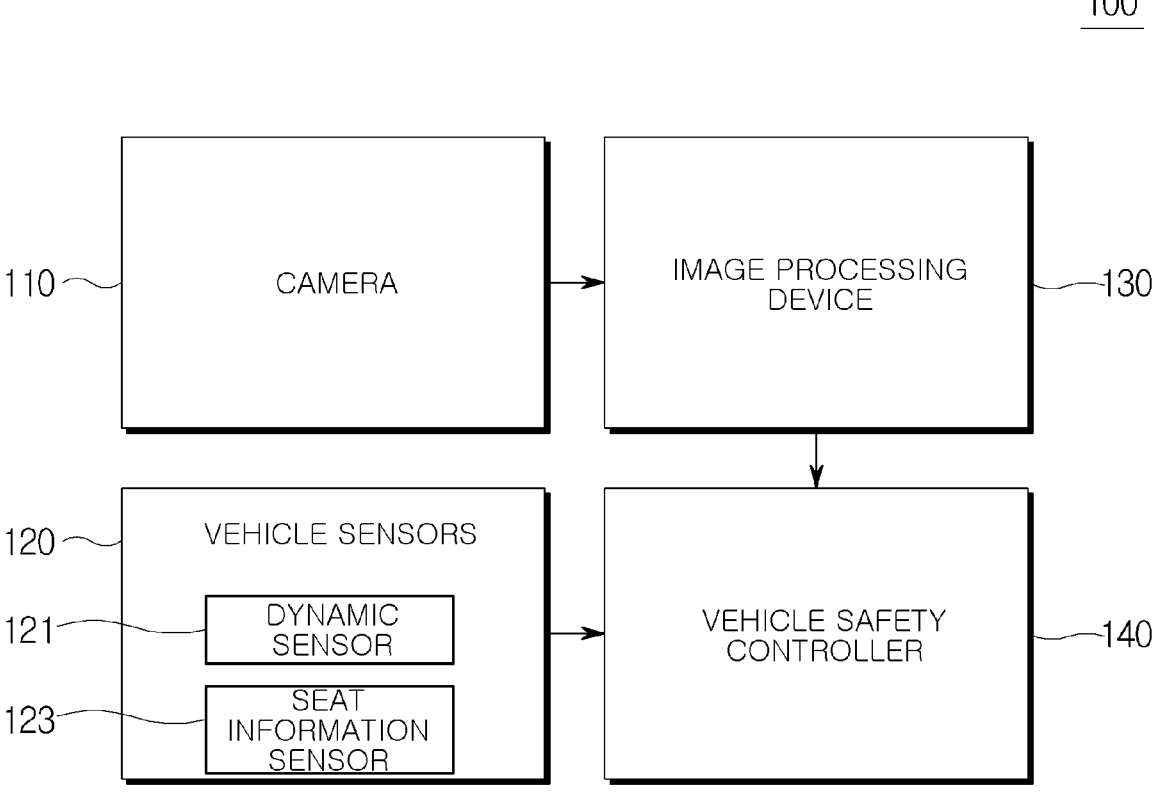
FIG. 1 shows a system for estimating behaviors of an occupant within a vehicle in accordance with various embodiments of the present disclosure.

The features, advantages and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are provided to make those skilled in the art fully understand the scope of the present invention. The present invention is just defined by the scope of the appended claims. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, etc., can be used to describe various components, the components are not limited by the terms mentioned above. The terms are used only for distinguishing between one component and other components.

Therefore, the first component to be described below may be the second component within the spirit of the present invention. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Hereinafter, various embodiments will be described in detail with reference to the accompanying drawings.

Figure 2:
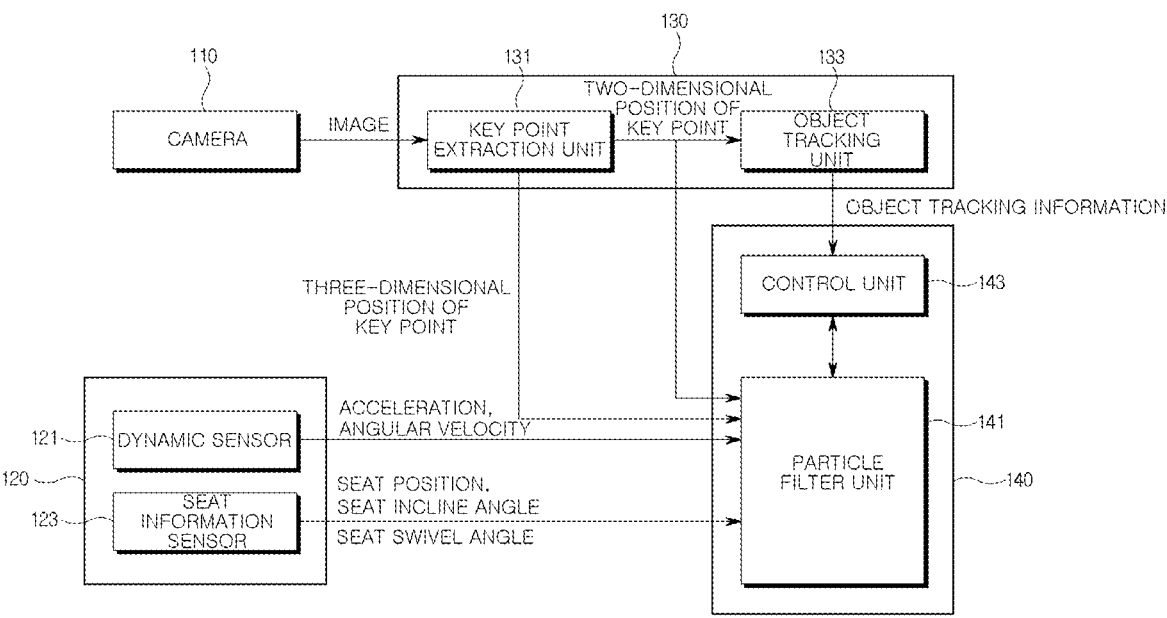
FIG. 2 shows the flow of information in the occupant behavior estimation system.

FIG. 1 shows an occupant behavior estimation system 100 within a vehicle in accordance with various embodiments. FIG. 2 shows the flow of information in the occupant behavior estimation system 100.

Referring to FIG. 1, the occupant behavior estimation system 100 may include a camera 110, a plurality of vehicle sensors 120, an image processing device 130, and a vehicle safety controller 140.

The camera 110 may obtain an image including an occupant by taking a photograph of a direction of a seat within the vehicle in which the occupant can sit.

The plurality of vehicle sensors 120 may be provided at various locations within the vehicle in order to obtain information on the interior of the vehicle, and in particular, may include a dynamic sensor 121 and a seat information sensor 123. The dynamic sensor 121 is capable of detecting information related to the movement of the vehicle. The seat information sensor 123 is capable of detecting information that includes a sitting state of the occupant and is related to the seat in which the occupant sits. Here, the dynamics sensor 121 may include an acceleration sensor and a yaw rate sensor, and the seat information sensor 123 may include an occupant detection system (ODS) sensor that detects the sitting of the occupant, a position sensor, an incline sensor, a swivel sensor, and the like.

The image processing device 130 may be a device capable of processing the image obtained through the camera 110 and of extracting key point information of the occupant and additional object tracking information. The image processing device 130 may include a key point extraction unit 131 and an object tracking unit 133.

According to an exemplary embodiment of the present disclosure, the image processing device 130 may include a processor (e.g., computer, microprocessor, CPU, ASIC, circuitry, logic circuits, etc.) and an associated non-transitory memory storing software instructions which, when executed by the processor, provides the functionalities of the key point extraction unit 131 and the object tracking unit 133. Herein, the memory and the processor may be implemented as separate semiconductor circuits. Alternatively, the memory and the processor may be implemented as a single integrated semiconductor circuit. The processor may embody one or more processor(s).

After processing the image obtained through the camera, the key point extraction unit 131 may extract the key point of the occupant through deep learning such as a convolutional neural network (CNN) or computer vision technique. The key point of the occupant may include main points of injury of the occupant, such as head, neck, shoulder, etc., and may extract, for each key point, a two-dimensional position on an image plane and a three-dimensional position in space. According to the embodiment, the three-dimensional position may not be extracted.

The object tracking unit 133 may detect the occupant by using an object tracking logic because, through the object tracking logic, it is possible to more robustly determine the occupant is present or not and to assign the key point information of the occupant extracted from continuous images to the same occupant.

The object tracking unit 133 may generate the object tracking information by tracking the occupant detected in the continuous images obtained from the camera 110, and may transmit the generated object tracking information to the vehicle safety controller 140. The object tracking unit 133 may also determine the object tracking information corresponding to the occupant detected through a deep learning technique such as CNN or a computer vision technique. The object tracking information may include identification (ID) number, key point information, bounding box information, and sitting information of the tracked occupant. According to the embodiment, the object tracking unit 133 may extract and track an occupant at a certain time interval or in every image frame, and may transmit the result as the object tracking information to the vehicle safety controller 140. Here, when it is determined that the tracked occupant is the same as the previously tracked occupant, the same identification number may be used. When the tracked occupant is a newly recognized occupant, a new identification number may be assigned and provided.

The vehicle safety controller 140 may be mounted on the vehicle, may fuse information obtained from the image processing device 130 and information obtained from the plurality of vehicle sensors 120, and may estimate a three-dimensional behavior of the occupant by using a particle filter.

The particle filter is one of the prediction technologies based on simulation, is also called a sequential Monte Carlo (SMC) method, and may be an algorithm suitable for a nonlinear or non-Gaussian system. The particle filter can predict continuously incoming information only based on observed values with errors. The particle filter may apply an input randomly generated with a probability distribution appropriately proposed for the system, and synthesize the results, and then extract the information of the system.

The vehicle safety controller 140 may generate separate particle filters independent of each other for each occupant, and thus, identity the behavior of each occupant.

The vehicle safety controller 140 may include a control unit 143 and a particle filter unit 141. According to an exemplary embodiment of the present disclosure, the vehicle safety controller 140 may include a processor (e.g., computer, microprocessor, CPU, ASIC, circuitry, logic circuits, etc.) and an associated non-transitory memory storing software instructions which, when executed by the processor, provides the functionalities of the control unit 143 and the particle filter unit 141. Herein, the memory and the processor may be implemented as separate semiconductor circuits. Alternatively, the memory and the processor may be implemented as a single integrated semiconductor circuit. The processor may embody one or more processor(s).

The control unit 143 may be provided while updating in real time information on an object being tracked. The information on the object being tracked may include an identification (ID) number for identifying an occupant from respective existing occupants, bounding box information, the number of times the object is not tracked, sitting information, and the like. An identification number that is the same as the identification number of each occupant included in the object tracking information received from the image processing device 130 may be used as the identification number of the information on the object being tracked.

The control unit 143 may determine the sitting information of the occupant by using the seat information sensor 123 such as an ODS sensor or by determining whether an IoU value between the bounding box of the seat and the bounding box of the occupant is equal to or greater than a predetermined threshold value. Alternatively, the two methods may be used in a combination of them. Here, the bounding box of the seat may be changed according to seat information.

According to the embodiment, when the seat information sensor 123 provides information that the occupant is sitting, the control unit 143 may determine that the corresponding occupant is sitting.

According to another embodiment, when the IoU value between the bounding box of the seat and the bounding box of the occupant is equal to or greater than a predetermined threshold value, the control unit 143 may determine that the occupant is sitting.

The control unit 143 may determine whether the occupant is sitting through a combination of the above two pieces of information. This will be described in detail below.

According to the embodiment, the seat information sensor 123 may provide "adult," "small (child)," "empty (no sitting)," and "indeterminate" as the sitting information.

The control unit 143 may set differently a condition that the occupant is recognized as sitting and a condition that the occupant is recognized as being released from sitting (a condition that the occupant is recognized as being out of position (OOP)) in accordance with the sitting information provided by the seat information sensor 123.

According to the embodiment, in a case where the sitting information recognized by the seat information sensor 123 indicates that the occupant as "adult" or "child" is sitting, the control unit 143 may recognize the occupant as sitting when the IoU value between the bounding box around the seat and the bounding box of the occupant is greater than a predetermined threshold value. If the vehicle is traveling, the control unit 143 may set that an adult is always sitting in a driver's seat regardless of occupant information recognized by the seat information sensor 123.

In a case where the control unit 143 recognizes the occupant as sitting, when the seat information sensor 123 provides information indicating "empty (no sitting)," and the case that the IoU value between the bounding box around the seat and the bounding box of the occupant is smaller than or equal to a predetermined threshold value is occurred more than a predetermined number of times, the control unit 143 may release the recognition that the occupant is sitting.

In a case where the control unit 143 recognizes the occupant as not sitting, when the seat information sensor 123 provides information indicating no one is sitting, the control unit 143 may continuously recognize the occupant as not sitting regardless of the IoU value.

According to the embodiment, in the case where the occupant information recognized by the seat information sensor 123 is "indeterminate", the control unit 143 may recognize the occupant as sitting when the IoU value between the bounding box around the seat and the bounding box of the occupant is greater than a predetermined threshold value. Here, the threshold value when the occupant information is "indeterminate" may be a larger than the threshold value used in the determination of whether the occupant is sitting or not. Also, in the case where the occupant information recognized by the seat information sensor 123 is "indeterminate" and the control unit 143 recognizes the occupant as sitting, the case where the IoU value between the bounding box around the seat and the bounding box of the occupant is greater than a predetermined threshold value is not satisfied more than a predetermined number of times, the control unit 143 may release the recognition that the occupant is sitting.

Based on the information on the object being tracked and the object tracking information received from the image processing device 130, the control unit 143 determines whether the detection of an existing occupant fails or whether a new occupant is detected. Based on the result of the determination, the control unit 143 may control to create the particle filter for a new occupant or to remove the particle filter for an existing occupant who has failed to be detected.

Based on the object tracking information obtained from the object tracking unit 133, a three-dimensional position information and/or a second-dimensional position information of the key point obtained from the key point extraction unit 131, and the information on the object being tracked, the control unit 143 may determine whether the detection of an existing occupant fails or whether a new occupant is detected.

Figure 3:
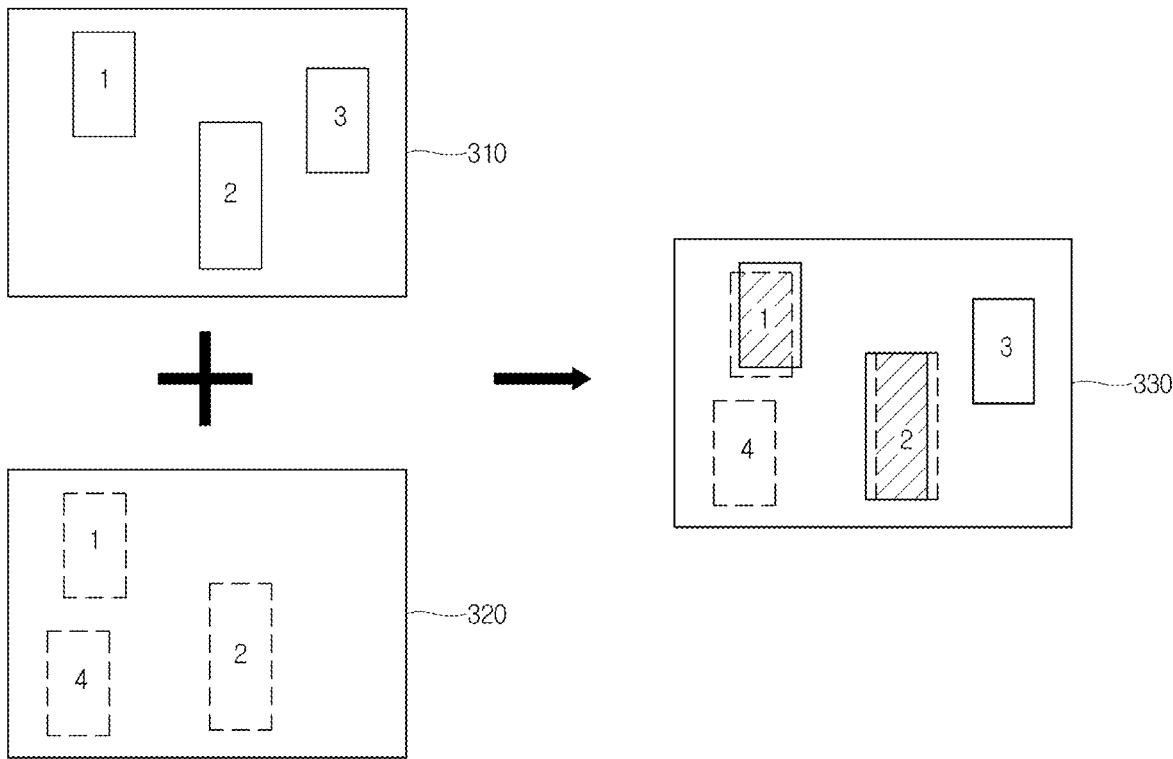
FIG. 3 shows an example in which a control unit detects an occupant.

FIG. 3 shows an example in which the control unit 143 detects the occupant.

Referring to FIG. 3, the control unit 143 may obtain bounding box information 310 on each occupant being tracked. The bounding box information on each occupant being tracked may be obtained based on behavior information of each occupant determined by the particle filter created for each occupant being tracked. According to the embodiment, the bounding box information on each occupant may be generated by the particle filter unit 141 and transmitted to the control unit 143. According to another embodiment, the control unit 143 may obtain the estimated key point position information on each occupant from the particle filter unit 141, and may directly generate the bounding box information on each occupant based thereon. In the example of FIG. 3, the control unit 143 may obtain the bounding box information on the existing occupants having identification numbers 1, 2, and 3, respectively.

The control unit 143 may obtain bounding box information 320 on the currently detected occupant based on the information obtained by the image processing device 130. According to the embodiment, the image processing device 130 may generate the bounding box information on the detected occupant and provide it to the control unit 143. However, according to another embodiment, the control unit 143 may also generate the bounding box information on the detected occupant based on the object tracking information received from the image processing device 130 and the key point information.

The control unit 143 may perform matching such that a sum of the intersection over union (IoU) between the bounding box of the occupant being tracked and the bounding box of the currently detected occupant is maximized. The control unit 143 may determine whether the detection of an existing occupant fails or whether a new occupant is detected based on the matching result 330.

Figure 4:
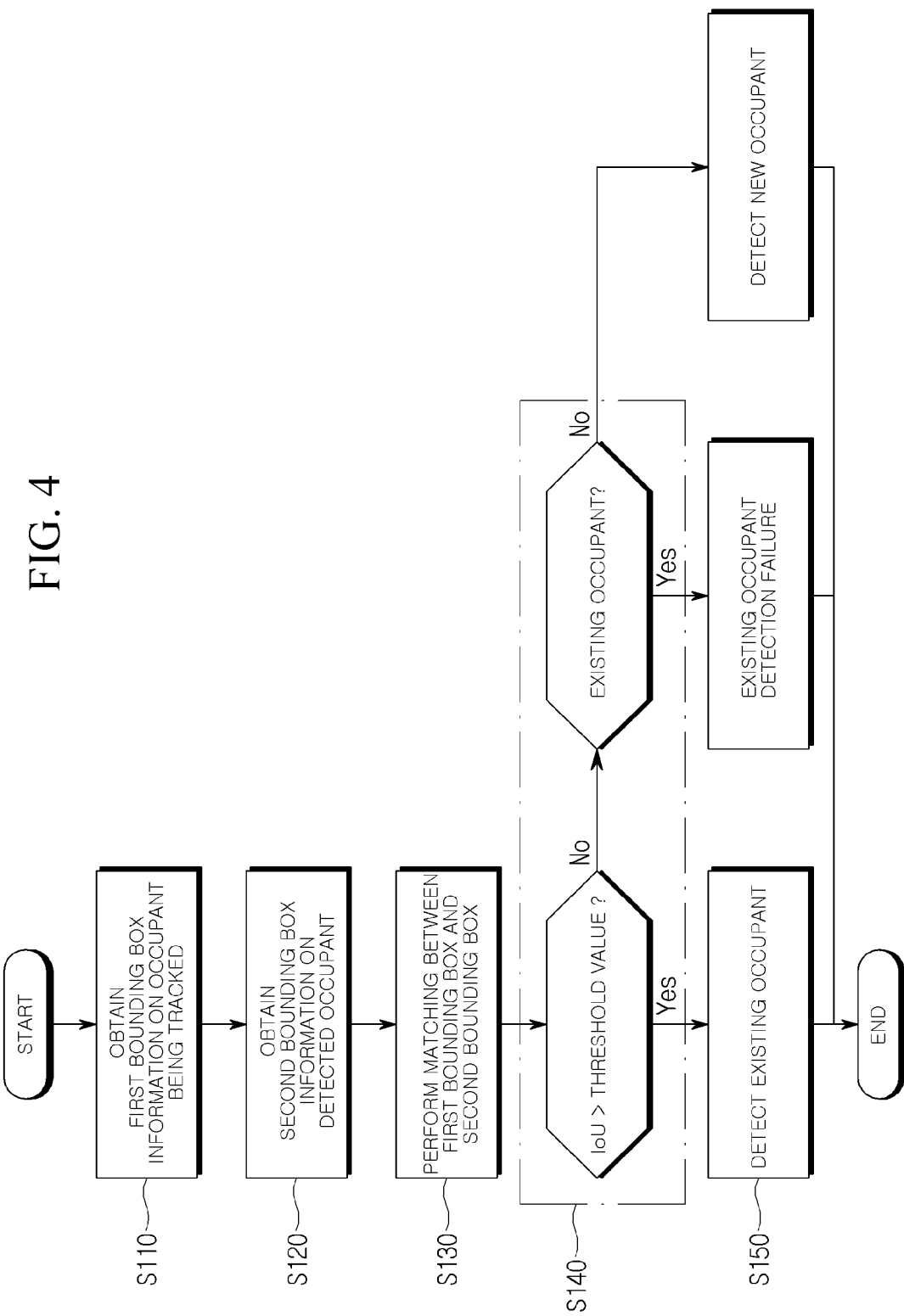
FIG. 4 shows an operation of the control unit that determines the occupant detection according to various embodiments of the present disclosure.

FIG. 4 shows an operation of the control unit 143 that determines the occupant detection according to various embodiments.

Referring to FIG. 4, the control unit 143 may obtain first bounding box information on the occupant being tracked in step S110. The control unit 143 may obtain second bounding box information on the detected occupant in step S120. In step S130, the control unit 143 may perform matching such that the sum of the IoU between the first bounding box and the second bounding box is maximized.

In step S140, the control unit 143 determines whether the IoU is greater, for each identification number, than a predetermined threshold value and whether the existing occupant is present, thereby determining whether the occupant corresponding to each identification number is detected as an existing occupant, whether the detection of the existing occupant fails or whether the occupant is detected as a new occupant.

Referring to the example of FIG. 3, based on the matching result 330, occupants of identification numbers 1 and 2 each have the IoU greater than a predetermined threshold value, so that the control unit 143 may determine that the occupants are detected as existing occupants. Since an occupant having an identification number 3 has the IoU less than the predetermined threshold value and the identification number is for the occupant being tracked, the control unit 143 may determine the detection of the existing occupant as having failed. Since an occupant having an identification number 4 has the IoU less than the predetermined threshold value and the identification number is for a newly detected occupant, the control unit 143 may determine that the occupant is detected as a new occupant.

FIGS. 3 and 4 show only embodiments. The control unit 143 may determine whether the occupant is detected as an existing occupant, whether the detection of the existing occupant fails or whether the occupant is detected as a new occupant, based on another method, for example, a method of comparing an identification number for the occupant being tracked and an identification number for the detected occupant included in the object tracking information obtained from the object tracking unit 133.

When the detection of the existing occupant fails, the control unit 143 may remove the particle filter corresponding to the occupant According to the embodiment, the control unit 143 may immediately remove the particle filter when the detection of the existing occupant fails. However, according to another embodiment, when the control unit 143 increases the number of times that the occupant is not tracked by 1 and the number of times that the occupant is not tracked is greater than a predetermined value, the control unit 143 may remove the corresponding particle filter. When it is necessary to remove the particle filter, the control unit 143 may instruct the particle filter unit 141 to remove the particle filter.

When it is determined that a new occupant is detected, the control unit 143 may instruct the particle filter unit 141 to create a particle filter for estimating the behavior of the new occupant.

When it is determined that an existing occupant is detected, the control unit 143 may instruct the particle filter unit 141 to update the particle filter corresponding to the corresponding occupant in order to estimate the behavior of the existing occupant.

The particle filter unit 141 obtains vehicle internal sensor information including sitting information, an acceleration, an angular velocity, a seat position, a seat incline angle, and a seat swivel angle, the two-dimensional position information and/or three-dimensional position information of the key point. Based on these pieces of information, the particle filter unit 141 can estimate the behavior of the occupant.

The particle filter unit 141 may include a separate particle filter for each detected occupant in order to estimate the behavior of each detected occupant.

Figure 5:
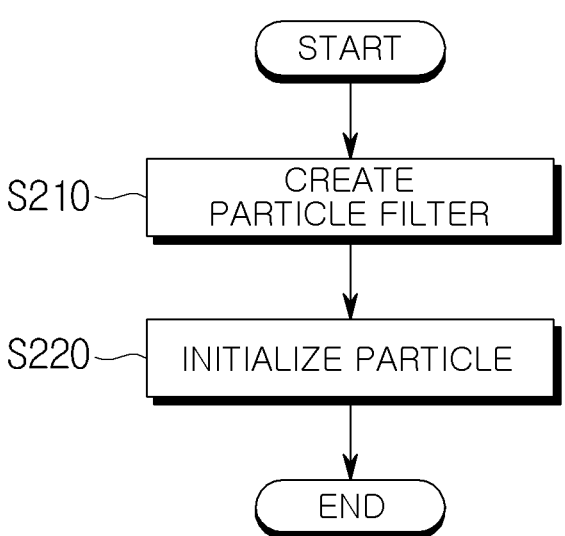
FIG. 5 shows a particle filter generation operation of a particle filter unit according to a particle filter creation command of the control unit.

FIG. 5 shows a particle filter generation operation of the particle filter unit 141 according to a particle filter creation command of the control unit 143.

When a new occupant is detected, the control unit 143 may request the particle filter unit 141 to create a particle filter corresponding to the occupant.

In response to the particle filter creation request for the new occupant, the particle filter unit 141 may create a new particle filter corresponding to the new occupant in step S210, and may initialize particles of the particle filter in step S220. According to the embodiment, if the detected new occupant is in a sitting state, the particle filter unit 141 may initialize particles based on the seat information obtained by using the seat information sensor. If the detected new occupant is in an out of position (OOP) state, the particle filter unit 141 may initialize particles by using the three-dimensional position information of the key point. Here, the OOP state may indicate a sitting release state, that is, a no sitting state.

When the occupant in the sitting state is detected, the particle filter unit 141 may initialize particles by parameters of the occupant in the sitting state set differently according to modeled seat information. Here, the parameter may be a predetermined value based on the seat information and may be obtained and adjusted through a study on the estimation of the seat information use occupant posture, a study on the posture of a sitting occupant depending on a seat incline angle, and the like. According to another embodiment, in the case of the occupant in the sitting state, the particle filter unit 141 may initialize particles by mixing the parameters of the occupant in the sitting state according to the seat information and the three-dimensional initial measurement value of the key point in a certain ratio.

When the occupant in the OOP state is detected, that is, when the occupant is detected through key point analysis while obtaining "empty" information from the seat information sensor 123, the particle filter unit 141 may initialize the particles by an occupant model parameter calculated through the three-dimensional initial measurement value of the key point since the seat information cannot be used.

According to the embodiment, the number of particles that is initialized when the particle filter is created may be set to a fixed value.

Here, each particle may be composed of a weighting and a parameter of the occupant body model. The occupant body model may calculate the three-dimensional position of the key point of interest from the minimum parameters and may include a dynamics model. The current state of the particle can be checked by the dynamics model. According to the embodiment, the parameter of the occupant body model may include the three-dimensional position of a reference key point such as neck and pelvis, a distance between the key points (related to the size of the occupant and may mean the length of the arm and/or leg), and the angle of each joint or the angle between lines connecting the key points. According to the embodiment, the parameter of the occupant body model may be divided into a male body model parameter, a female body model parameter, or an infant body model parameter.

Figure 6:
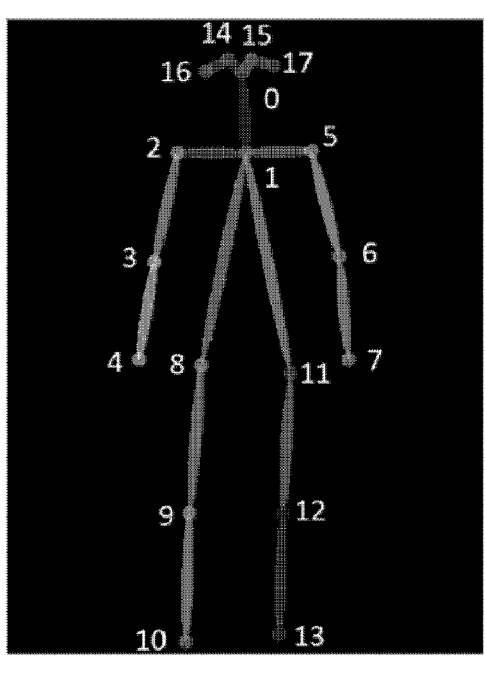
FIG. 6 shows an example of a reference key point.
Figure 6:
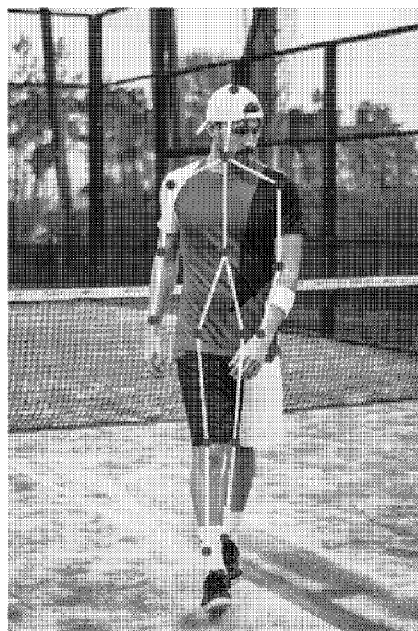

FIG. 6 shows an example of the reference key point.

Referring to FIG. 6, according to the embodiment, each joint of the human body may be set as the reference key points.

After initializing the particle of the particle filter for a new occupant, the particle filter unit 141 may update the particle filter immediately and estimate the behavior of the occupant.

When the particle filter unit 141 receives an update command of the particle filter for the existing occupant from the control unit 143, the particle filter unit 141 may update the particle filter and estimate the behavior of the occupant.

That is, when the particle filter unit 141 receives a particle generation command for a new occupant from the control unit 143, the particle filter unit 141 may generate a particle filter for the corresponding new occupant, initialize the particles of the corresponding particle filter, and then receive an update command of the particle filter for the existing occupant from the control unit 143. After that, the particle filter unit 141 may update the corresponding particle filter.

After updating the particle filter, the particle filter unit 141 may estimate the behavior of the corresponding occupant.

Figure 7:
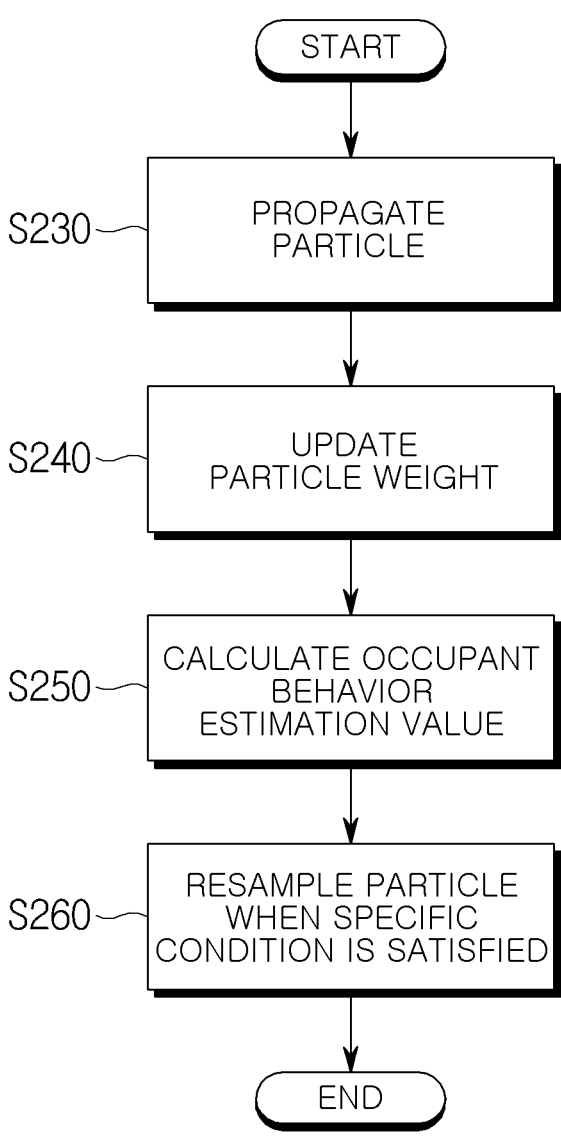
FIG. 7 shows a particle filter update operation of the particle filter unit.

FIG. 7 shows a particle filter update operation of the particle filter unit 141.

The particle filter update operation shown in FIG. 7 may be independently performed on all the generated particle filters.

Referring to FIG. 7, in step S230, the particle filter unit 141 may propagate particles in a predicted state by using a dynamic sensor measurement value and the dynamics model of the occupant.

Here, the dynamic sensor 121 may be an inertial measurement unit (IMU) sensor, and the measured value may include 3-axis acceleration and 3-axis angular acceleration. The dynamics model of the occupant can be defined as the following function. That is, the dynamics model F may be a function of a state X of the occupant, a measurement value of the IMU sensor, and minute time "dt".

$$X\_predicted = F(X, IMU\ Sensor, dt) \quad \text{Equation (1)}$$

According to the embodiment, the dynamics model F may be modeled as a mass-spring-damper system.

According to another embodiment, the dynamics model may be modeled by an empirical or intuitive method. For example, when the x-axis value of the IMU sensor increases, the dynamics model may be modeled as leaning forward, and when the yaw-rate increases, the dynamics model may be modeled as leaning in the direction of centrifugal force. On the other hand, since a greater acceleration may cause the dynamics model to be more accurate and more effective, the dynamics model can play a role in predicting the sudden behavior of the occupant and in helping the particles to follow the behavior well. Accordingly, only when the measurement value of the IMU sensor exceeds a certain threshold, the dynamics model can be applied.

According to the embodiment, in step S230, the particle filter unit 141 may propagate the particles by additionally adding radio noise to an X_predicted value predicted in Equation (1).

The particle filter unit 141 may update a particle weighting in step S240. The particle weighting may be updated in a variety of ways. For example, particle weighting information may be updated by using prior probability information, the two-dimensional position information of the key point, the three-dimensional position information of the key point, or the seat information obtained from the seat information sensor 123. Alternatively, the particle weighting information may be updated in a combination of at least some of the above-mentioned update methods.

The method of updating the particle weighting information by using the prior probability information may include that the particles of a physically impossible posture or particles out of the vehicle interior are removed. In addition, the particle weighting may be updated by using information that can be obtained in advance, such as updating the weighting by using statistical numerical values of the human body. That is, particles that do not meet the conditions may be removed (the weighting is updated to 0) or the weighting may be reduced by using the information obtained in advance.

For example, the particle may be removed or the weighting may be reduced by determining through a joint angle parameter of the particle whether both shoulders are bent at a large angle around the neck or the neck is abnormally bent. The particle filter unit 141 may calculate the three-dimensional position of the key point from the occupant body parameters of the particle, and may calculate the joint angle of the occupant from the calculated three-dimensional position of the key point. Also, if the posture of the occupant is recognized as an impossible posture from the calculated joint angle, the particle filter unit 141 may remove the particles or may reduce the weighting.

In addition, even when the three-dimensional coordinates of the key point calculated from the particle parameters are out of the vehicle interior, the particles may be removed. The particle filter unit 141 has in advance position information corresponding to the vehicle interior or information on a field of view (FOV) of the camera. When the three-dimensional coordinates of the key point, which correspond to the particle are out of the corresponding range, the particle filter unit 141 may reduce the particle weighting or may remove the particle.

In addition, a condition for information on a distance between the key points is set by reflecting data on a body size among the statistical numerical values of the human body, and when the three-dimensional coordinates of the key point calculated from the particle parameters do not satisfy the set condition, the particles may be removed or the weighting may be reduced. Alternatively, even when a distance between the three-dimensional coordinates of the key point calculated from the particle parameters indicates an abnormal distance between major parts or abnormal body proportions, the particles may be removed or the weighting may be reduced.

The method of updating the particle weighting information by using the two-dimensional position information of the key point is to calculate a likelihood probability of the particle by first projecting the three-dimensional coordinates of the key point calculated from the particle parameters onto an image plane and is to update the particle weighting information based on the calculated probability value. Here, according to the embodiment, the two-dimensional position information of the key point may be modeled as a probability distribution such as a multivariate normal distribution, etc.

The method of updating the particle weighting information by using the three-dimensional position information of the key point is to calculate the likelihood probability of the particle through the three-dimensional coordinates of the key point calculated from the particle parameters and is to update the particle weighting information based on the calculated probability value. Here, according to the embodiment, the three-dimensional position information of the key point may be modeled as a probability distribution such as a multivariate normal distribution, etc.

According to the method of updating the particle weighting information by using the seat information sensor, when an occupant in the sitting state is detected, the coordinates of the key point calculated from the seat information are compared with and the three-dimensional coordinates calculated from the particles, and then the weighting may be updated in inverse proportion to the distance. For example, the particle weighting may be updated by increasing the weighting when said both coordinates are located similarly, and by decreasing the weighting when said both coordinates are far apart. Here, the coordinates of the key point calculated from the seat information may be the coordinates of the key point obtained from the parameters of the occupant in the sitting state according to the seat information modeled in advance. For example, predicted coordinates of each joint parameter of the sitting occupant may be estimated based on at least one of the position information, the incline information, and the swivel information of the seat. The closer the predicted coordinates and the three-dimensional coordinates calculated from the particles are, the higher the weighting is assigned. When the three-dimensional coordinates are out of a specific range set based on the predicted coordinates, the weighting may be updated to 0.

In step S250, the particle filter unit 141 may calculate an occupant behavior estimation value based on the weighting of the particle of each particle filter that is currently being tracked. According to the embodiment, the particle filter unit 141 may estimate the position of each key point as an average value that reflects the weighting or as a value corresponding to a particle having a maximum weighting. According to the embodiment, since the particle corresponding to each key point can indicate the position of the joint of the occupant, the position of the joint of each occupant can be estimated from the estimated position of the particle, and the behavior of the occupant can be estimated therefrom.

In step 260, when a specific condition is satisfied, the particle filter unit 141 may perform particle resampling. Here, the specific condition may include a case where the number of effective particles is smaller than a predetermined threshold value. Alternatively, the specific condition may also correspond to a case where a specific number or more of particles is out of the vehicle interior in a vehicle system. Alternatively, the specific condition may also include a case where there is a small number of particles indicating the sitting state although an occupant who is in the sitting state is detected.

According to the embodiment, the particle filter unit 141 may perform resampling every cycle regardless of whether the specific condition is satisfied.

As described above, the vehicle safety controller 140 may specify a plurality of occupants based on the object tracking information from the image processing device 130, may create the particle filter corresponding to each of the plurality of occupants, may obtain the two-dimensional position information and/or three-dimensional position information of the key point, which correspond to the occupants respectively, from the image processing device 130, may obtain acceleration, angular velocity, seat position, seat incline angle, and seat swivel angle information from the plurality of vehicle sensors 120 attached to the vehicle, may initialize the particle of the particle filter corresponding to each occupant, may propagate the particles, may update the particle weighting, and finally may estimate the occupant behavior measurement value.

The vehicle safety controller 140 may obtain the joint angle of the occupant based on the three-dimensional position of the occupant key point or the occupant behavior estimated by the particle filter unit 141, and may recognize various postures of the occupant according to an autonomous driving environment based on the obtained joint angle. For example, the vehicle safety controller 140 may recognize the occupant as being in a posture in which the occupant lies down with the chair tilted back or as leaning forward. The vehicle safety controller 140 may be used for safety control, such as controlling an airbag deployment timing, etc., based on the estimated behavior of the occupant or the posture of the occupant obtained therefrom.

In addition, the vehicle safety controller 140 may recognize whether the three-dimensional position of a main portion of injury among the key points of the occupant is included in a specific area of the interior of the vehicle based on the value estimated by the particle filter unit 141. For example, the vehicle safety controller 140 may recognize whether the head of the occupant is near the steering wheel or the windshield. Also, the vehicle safety controller 140 may recognize whether the three-dimensional position of the main portion of injury is included in a specific area of the interior of the vehicle, and may use this for safety control. For example, when recognizing that the head is near the windshield, the vehicle safety controller 140 may control a side airbag deployment timing to be earlier.

Also, the vehicle safety controller 140 may recognize relative positions between the occupants from the estimated three-dimensional position of the key point of each occupant, thereby predicting and/or preventing a collision between the occupants in the event of an accident. For example, the vehicle safety controller 140 may be used to determine a center airbag deployment timing based on the relative positions between the estimated occupants.

Control operations after the above-described behavior may be performed by the control unit 143 of the vehicle safety controller 140. According to another embodiment, the control operations may be performed by a safety control unit (not shown) provided separately from the control unit 143.

What is claimed is:

1. An occupant behavior estimation system that estimates behaviors of at least one occupant within a vehicle, the occupant behavior estimation system comprising:

a camera configured to obtain images of the at least one occupant within the vehicle;

sensors configured to obtain information on the vehicle;

an image processing device configured to process the images obtained from the camera and to obtain key point information of the at least one occupant and object tracking information that is provided by tracking the at least one occupant; and a vehicle safety controller configured to estimate the behaviors of each of the at least one occupant by using a particle filter based on the information on the vehicle obtained through the sensors, the key point information and the object tracking information comprising information on the at least one occupant, which are obtained from the image processing device, and to control the vehicle based on the estimated behaviors of each of the at least one occupant, wherein the vehicle safety controller is further configured to:

determine whether a new occupant is detected based on an existing occupant tracked by the particle filter, and create a particle filter corresponding to the new occupant in response to determining that the new occupant is detected.

2. The occupant behavior estimation system of claim 1, wherein the sensors comprise at least one of a seat information sensor or a dynamic sensor, wherein the seat information sensor Is configured to provide occupant sitting information, a seat position, a seat incline angle, and a seat swivel angle, and wherein the dynamic sensor is configured to provide information on an acceleration and an angular acceleration of the vehicle.

3. The occupant behavior estimation system of claim 2, wherein the key point information obtained by the image processing device comprises two-dimensional position information of a key point which indicates a two-dimensional position of the key point on an image plane.

4. The occupant behavior estimation system of claim 3, wherein the key point information obtained by the image processing device further comprises three-dimensional position information of the key point which indicates a three-dimensional position of the key point on an image plane.

5. The occupant behavior estimation system of claim 4, wherein the image processing device obtains the key point information by using an artificial intelligence system which has learned in advance or using a computer vision technique.

6. The occupant behavior estimation system of claim 4, wherein the vehicle safety controller comprises a control unit and a particle filter unit, wherein the control unit is configured to:

generate information on an object being tracked which comprises information on the existing occupant being tracked by using the particle filter, determine whether detection of the existing occupant fails and whether the new occupant is detected, based on the information on the object being tracked and the object tracking information obtained from the image processing device, instruct, in response to determining that the new occupant is detected, the particle filter unit to create the particle filter corresponding to the new occupant, and instruct, in response to determining that the detection of the existing occupant fails, the particle filter unit to remove a particle filter corresponding to the existing occupant, and wherein the particle filter unit is configured to create, update, or remove a particle filter based on an instruction of the control unit.

7. The occupant behavior estimation system of claim 6, wherein the particle filter unit creates the particle filter based on the instruction of the control unit, and then updates the corresponding particle filter, and wherein updating the particle filter comprises propagating particles of the particle filter, updating weightings of the particles, calculating a behavior estimation value based on the weightings, and resampling the particles of the particle filter when a specific condition is satisfied.

8. The occupant behavior estimation system of claim 7, wherein the particle filter unit propagates the particles of the particle filter for each occupant based on the information on the acceleration and the angular acceleration of the vehicle obtained from the dynamic sensor and a dynamics model of the occupant.

9. The occupant behavior estimation system of claim 8, wherein the particle filter unit propagates the particles of the particle filter for each occupant by additionally using the dynamics model of the occupant only when the acceleration or the angular acceleration of the vehicle obtained from the dynamic sensor is greater than a second predetermined threshold value.

10. The occupant behavior estimation system of claim 7, wherein the particle filter unit updates weightings of particles of the particle filter based on at least one of prior probability information, the two-dimensional position information of the key point of the existing occupant, the three-dimensional position information of the key point, or seat information obtained from the seat information sensor.

11. The occupant behavior estimation system of claim 10, wherein the updating the weightings of the particles based on the prior probability information comprises:

updating the weightings of the particles which indicate the key point corresponding to a physically impossible posture to 0, or updating the weightings of the particles of which a position is out of a vehicle interior to 0, or having range information corresponding to the vehicle interior or photographing range information according to a field of view of the camera, and when three-dimensional coordinates of the key point, which correspond to the particles, are out of a range of the range information or the photographing range information, reducing the weightings of the particles or updating the weightings of the particles to 0, or setting in advance a condition for information on a distance between key points by reflecting data on a statistical body size of a human body, and when the three-dimensional coordinates of the key point, which correspond to the particles, do not satisfy the set condition, reducing the weightings of the corresponding particles or updating the weightings of the corresponding particles to 0.

12. The occupant behavior estimation system of claim 10, wherein the updating the weightings of the particles based on the two-dimensional position information of the key point or the three-dimensional position information of the key point comprises calculating a likelihood probability of the particles based on the two-dimensional position information of the key point or the three-dimensional position information of the key point, which corresponds to the particles, and updating particle weighting information based on the calculated likelihood probability.

13. The occupant behavior estimation system of claim 10, wherein the updating the weightings of particles based on at least one of the seat information comprises comparing coordinates of first key point of occupant who has sat obtained from the seat information with coordinates of second key point calculated from the particles, and then updating the weightings in inverse proportion to a distance between the coordinates of the first and the second key points.

14. The occupant behavior estimation system of claim 7, wherein the vehicle safety controller estimates a position of the key point of the existing occupant as an average value that reflects a weighting of a position of the key point corresponding to the particles, or estimates the position of the key point of the existing occupant as a position of the key point corresponding to a particle having a maximum weighting.

15. The occupant behavior estimation system of claim 7, wherein the vehicle safety controller performs particle resampling when the number of effective particles of the particle filter is smaller than a third predetermined threshold value, or performs the particle resampling when the particles of which the number is greater than or equal to a fourth predetermined threshold value are located at a position out of a vehicle interior.

16. The occupant behavior estimation system of claim 6, wherein the control unit performs matching such that a sum of an intersection over union (IoU) between a bounding box of the existing occupant being tracked and a bounding box of the detected at least one occupant is maximized, and determines whether the detection of the existing occupant fails and whether the new occupant is detected, based on determining whether a value of the IoU for each occupant is greater than a predetermined threshold value.

17. The occupant behavior estimation system of claim 6, wherein the control unit determines whether the new occupant is in a sitting state, wherein the particle filter unit creates the particle filter for the new occupant, initializes particles of the particle filter for the new occupant based on seat information obtained from the seat information sensor in response to determining that the new occupant is in the sitting state, and initializes the particles of the particle filter by using the three-dimensional position information of the new occupant in response to determining that the new occupant is not in the sitting state, that is, in an out of position (OOP) state.

18. The occupant behavior estimation system of claim 17, wherein the control unit determines whether the new occupant is in the sitting state, based on the occupant sitting information obtained from the seat information sensor, or obtains a bounding box of a seat based on the seat information obtained from the seat information sensor and determines the new occupant as being in the sitting state when an intersection over union (IoU) between the bounding box of the seat and a bounding box of the new occupant is greater than or equal to a first predetermined threshold value.

19. The occupant behavior estimation system of claim 6, wherein, in response to determining that the detection of the existing occupant fails, the control unit records the number of detection failures of the existing occupant, and in response to determining that the number of detection failures is greater than a fifth predetermined threshold value, the control unit removes the particle filter corresponding to the corresponding existing occupant.

20. An occupant behavior estimation method of an occupant behavior estimation system, which estimates behaviors of each of at least one occupant within a vehicle, the occupant behavior estimation method comprising:

obtaining key point information from an image obtained through a camera;

detecting at least one occupant based on the key point information, and obtaining object tracking information comprising information on the detected at least one occupant;

estimating the behaviors of each of the at least one occupant by using a particle filter based on information on the vehicle obtained through sensors, the key point information, and the object tracking information;

controlling the vehicle based on the estimated behaviors of each of the at least one occupant;

determining whether a new occupant is detected based on an existing occupant tracked by the particle filter; and creating a particle filter corresponding to the new occupant in response to determining that the new occupant is detected.

\* \* \* \* \*